United States Patent
La et al.

(10) Patent No.: US 11,420,160 B2
(45) Date of Patent: Aug. 23, 2022

(54) METHOD OF REDUCING CARBON DIOXIDE AND METAL-CONTAINING DUST

(71) Applicant: SK Innovation Co., Ltd., Seoul (KR)

(72) Inventors: Yeon Hwa La, Daejeon (KR); Kwang Kuk Cho, Daejeon (KR)

(73) Assignee: SK Innovation Co., Ltd., Seoul (KR)

(*) Notice: Subject to any disclaimer, the term of this patent is extended or adjusted under 35 U.S.C. 154(b) by 349 days.

(21) Appl. No.: 16/647,098

(22) PCT Filed: Sep. 12, 2018

(86) PCT No.: PCT/KR2018/010653
§ 371 (c)(1),
(2) Date: Mar. 13, 2020

(87) PCT Pub. No.: WO2019/054733
PCT Pub. Date: Mar. 21, 2019

(65) Prior Publication Data
US 2020/0206685 A1 Jul. 2, 2020

(30) Foreign Application Priority Data
Sep. 13, 2017 (KR) .................. 10-2017-0117189

(51) Int. Cl.
*B01D 53/62* (2006.01)
*B01D 53/64* (2006.01)
*B01D 53/84* (2006.01)

(52) U.S. Cl.
CPC .............. *B01D 53/84* (2013.01); *B01D 53/62* (2013.01); *B01D 53/64* (2013.01);
(Continued)

(58) Field of Classification Search
CPC ............ B01D 2251/95; B01D 2257/60; B01D 2258/0291; B01D 53/84;
(Continued)

(56) References Cited

U.S. PATENT DOCUMENTS

| 8,691,175 B2 | 4/2014 | Kendall et al. |
| 2008/0268525 A1 | 10/2008 | Borole et al. |

(Continued)

FOREIGN PATENT DOCUMENTS

| CN | 1879946 A | 12/2006 |
| CN | 100357015 C | 12/2007 |

(Continued)

OTHER PUBLICATIONS

Vakylabad et al., "Tank bioleaching of copper from combined flotation concentrate and smelter dust", International Biodeterioration & Biodegradation, 2011, pp. 1208-1214, vol. 65:8.
(Continued)

*Primary Examiner* — Timothy C Vanoy
(74) *Attorney, Agent, or Firm* — The Webb Law Firm

(57) ABSTRACT

The invention relates to a method of reducing carbon dioxide and metal-containing dust and, more particularly, to a method of simultaneously reducing carbon dioxide and metal-containing dust by passing an off-gas, which contains carbon dioxide or carbon dioxide and metal-containing dust, through a reactor in which a sulfur-oxidizing microorganism is grown using carbon dioxide as a carbon source to produce sulfuric acid, and producing metal sulfates ($MeSO_4$) by reaction of the produced sulfur acid with metal components present in the off-gas.

6 Claims, 2 Drawing Sheets

(52) U.S. Cl.
CPC .... *B01D 2251/95* (2013.01); *B01D 2257/504* (2013.01); *B01D 2257/60* (2013.01); *B01D 2258/02* (2013.01)

(58) Field of Classification Search
CPC ...... B01D 2258/0283; B01D 2257/504; B01D 2258/02; B01D 53/62; B01D 53/64; B01D 2251/00; B01D 2258/025; Y02C 20/40; Y02A 50/20; Y02A 50/2351
See application file for complete search history.

(56) References Cited

U.S. PATENT DOCUMENTS

| | | | |
|---|---|---|---|
| 2013/0189739 | A1 | 7/2013 | Jin et al. |
| 2017/0218407 | A1 | 8/2017 | Reed |
| 2019/0256882 | A1 | 8/2019 | Park et al. |

FOREIGN PATENT DOCUMENTS

| | | |
|---|---|---|
| CN | 102586608 A | 7/2012 |
| CN | 106310890 A | 1/2017 |
| KR | 1020100032986 A | 3/2010 |
| KR | 1020180034281 A | 4/2018 |

OTHER PUBLICATIONS

Aita, Bruno Carlesso et al., "Biofiltration of H2S-rich biogas using Acidithiobacillus thiooxidans", Clean Technologies and Environmental Policy, 2015, pp. 1-15, Springer-Verlag Berlin Heidelberg. "Chemical Characteristics of PM2.5 and PM10 in Suwon Area", pp. 21-23. (with English-language translation).

Kim, Chung-Koo et al., "Chemical Characteristics of West Coast Regional fine aerosol of Daechon city", Journal of Korea Society of Environmental Administration, Mar. 2013, pp. 21-28, vol. 19(1). (with English-language Abstract).

Kim, Eun-Kyum et al., "Properties of Self-Compacting Concrete Using Ground Granulated Blast Furnace Slag and Fly ash", 2003, pp. 89-94. (with English-language Abstract).

Kong Boo-Ju et al., "Characteristics of Particle Composition at National Background Site", Journal of Korean Society for Atmospheric Environment—Spring Conference, Proceeding of the 50th Meeting of KOSAE, 2010, pp. 175-176, Korean Society for Atmospheric Environment, (with English-language translation).

Lee, Jae-Chun et al., "Bio-hydrometallurgy for the Recycling of Metal Resources in Urban Mine: a Review", Journal of the Korean Society for Geosystem Engineering, Jun. 27, 2011, pp. 385-395, vol. 48(3). (with English-language Abstract).

Lee, Kyoung-Bin et al., "Ion Compositional Existence Forms of PM10 in Seoul Area", J. Korean Soc. Envirn. Eng., 2015, pp. 197-203, vol. 37(4). (with English-language Abstract).

Lim, Ji-Eun et al., "Abstract—Study on Characteristics of Fine Particulate Matter(PM2.5) at a Gwangju area", 2015 Fall Joint Conference of the Geological Sciences, 2015, p. 474.

Ny, Mai Tra et al., "Analysis of Characteristics of Metals in Particulate Matter (PM10) from Ulsan in Fall", Journal of Korean Society for Atmospheric Environment, 2010 Spring Conference, Proceeding of the 50th Meeting of KOSAE, 2010, pp. 383-385, Korean Society for Atmospheric Environment, (with English-language translation).

Park, Jin-Soo et al., "The characteristics of Fine Particulate Matters in Urban Atmosphere", Journal of Korean Society of Environmental Engineers, Proceedings of the 2003 Spring Conference of the Korean Society of Environmental Engineers, May 1-3, 2003, pp. 605-607, Kaist. (with English-language translation).

Pathak, Ashish et al., "Feasibility of Bioleaching in Removing Metals (Al, Ni, V and Mo) from as Received Raw Petroleum Spent Refinery Catalyst: A Comparative Study on Leaching Yields, Risk Assessment Code and Reduced Partition Index", Materials Transactions, 2015, pp. 1278-1286, vol. 56(8), The Japan Institute of Metals and Materials.

Song, Jung-Min et al., "Composition Characteristics of PM10 and PM2.5 Fine Particulate Matters during Haze Days in 2014 at Background Area of Korea", 2014, p. 253.

Srichandan, Haragobinda et al., "Bioleaching of Spent Catalyst using Moderate Thermophiles with Different Pulp Densities and Varying size Fractions without Fe Supplemented Growth Medium", International Journal of Environmental, Chemical, Ecological, Geological and Geophysical Engineering, pp. 45-51, vol. 6(1), World Academy of Science, Engineering and Technology, 2012.

Stanton, Caleb W., "Sulfation Roasting and Leaching of Samarium-Cobalt: Magnet Swarf for Samarium Recovery", Thesis submitted to the Faculty and the Board of Trustees of the Colorado School of Mines, 2016, Golden, CO.

Yu, Ji-Yong et al., "A Study on Simultaneous Bioleaching of Copper and Manganese from Boleo Low-Grade Copper Oxide Ore Using Sulfur-Oxidizing Bacterium Acidithiobacillus thiooxidans", Journal of Korean Soc. Miner. Energy Resour. Eng., 2016, pp. 420-430, vol. 53(5), accessible at: http://dx.doi.org/10.12972/ksmer.2016.53.5.420. (with English-language Abstract).

METHOD OF REDUCING CARBON DIOXIDE AND METAL-CONTAINING DUST

CROSS-REFERENCE TO RELATED APPLICATIONS

This application is the United States national phase of International Application No. PCT/KR2018/010653 filed Sep. 12, 2018, and claims priority to Korean Patent Application No. 10-2017-0117189 filed Sep. 13, 2017, the disclosures of which are hereby incorporated by reference in their entirety.

BACKGROUND OF THE INVENTION

Field of the Invention

The present invention relates to a method of reducing carbon dioxide and metal-containing dust, and more particularly to a method of simultaneously reducing carbon dioxide and metal-containing dust by passing an off-gas, which contains carbon dioxide and metal-containing dust, through a sulfur-oxidizing microorganism reactor, thereby converting the carbon dioxide present in the off-gas into biomass and the metal components of the dust into metal sulfates ($MeSO_4$).

Description of Related Art

As interest in air pollutants such as greenhouse gases and fine dust has increased worldwide and regulations on dust emissions have become more stringent, countermeasures are urgently needed. Climate-change-inducing gases are emitted through various pathways, and the main contributor to greenhouse gas emissions is fossil fuel combustion. Greenhouse gases emitted through fossil fuel combustion account for 58% of the total amount of climate-change-inducing gases. During the combustion of fuels, for example, coal, oil such as diesel fuel or kerosene fuel, LNG, peat and waste, in combustion plants such as power plants, a high-temperature process gas containing, inter alia, carbon dioxide ($CO_2$), is generated. With increasing environmental demands, various processes for removing carbon dioxide from the process gas have been developed, and countermeasures against climate-change-inducing gases have been focused on reducing $CO_2$ gas emitted through fossil fuel combustion.

The amount of foreign fine dust, which affects air quality in South Korea, is generally about 30 to 50%, and the rest is generated from domestic thermal power plants, automobile exhaust gases, industrial facilities, and the like. Fine dust is not easily removed from the air, and is adsorbed by the alveoli in the body during respiration, thereby having an adverse effect on health. It is composed of a complex mixture of inorganic and organic compounds. Particles larger than 2.5 μm are classified as coarse particles, and particles smaller than 2.5 μm are classified as fine particles (dp<2.5 μm). Fine dust refers to PM2.5 (ultrafine dust; particle size: 2.5 μm or less), which is small in size, and similarly, PM10 refers to small dust having a diameter of 10 μm or less. PM2.5 is mainly caused by human activities, such as fossil fuel combustion, industrial activities and automobile emissions, and PM10 occurs naturally, like dust such as yellow dust. In particular, pulverized coal-fired power plants burn pulverized coal in a suspended state, and hence inevitably emit large amounts of fly ash. In order to reduce fine dust, efforts to reduce fine dust originating in South Korea are primarily needed, even though the influence of foreign countries should also be reduced. In South Korea, about 300 fine dust measurement stations are being operated, but still remain insufficient. Currently, only the components and characteristics of fine dust are being analyzed and studied (Jin-Soo Park et al., Proceedings of the 2003 Spring Conference of the Korean Society of Environmental Engineers, KAIST, May 1 to 3, 2003, pp. 605-607; Jung-Gu Kim et al., Journal of Korea Society of Environmental Administration, Vol. 19, No. 1, 21-28 (March 2013); Ji-Tae Kim et al., Proceedings of the 2010 Spring Conference of the Korea Society for Atmospheric Environment, pp. 383-385; Boo-Ju Kong et al, Proceedings of the 2010 Spring Conference of the Korea Society for Atmospheric Environment, pp. 175-176; Ji-Eun Lim et al., 2015 Fall Joint Conference of the Geological Sciences, Abstract, pp. 474), and there is urgent need for methods for treating and reducing fine dust.

SUMMARY OF THE INVENTION

Accordingly, the present inventors have made extensive efforts to solve the above-described problems, and have found that when an off-gas containing carbon dioxide and metal-containing dust is passed through a microbial incubator, the microorganism in the incubator grows using the carbon dioxide in the off-gas as a carbon source and the sulfur in the medium as an energy source, and the sulfuric acid ($H_2SO_4$) produced in the culture medium converts the metal components in the fine dust of the off-gas into sulfates, and thus effects of simultaneously reducing carbon dioxide and fine dust and solving environmental problems such as dust and heavy metals are realized, thereby completing the present invention.

An object of the present invention is to provide a method of reducing carbon dioxide and metal-containing dust, which are generated at industrial sites.

To achieve the above object, the present invention provides a method of reducing carbon dioxide and metal-containing dust, including a step of passing an off-gas through a sulfur-oxidizing microorganism reactor, thereby removing carbon dioxide and metal-containing dust present in the off-gas.

The present invention also provides a method of reducing metal-containing dust, including steps of: oxidizing sulfur or a sulfur-containing compound into sulfuric acid using a sulfur-oxidizing microorganism; and reacting the sulfuric acid with metals present in the metal-containing dust to produce metal sulfates.

DESCRIPTION OF THE INVENTION

Unless otherwise defined, all the technical and scientific terms used in the present specification have the same meanings as commonly understood by those skilled in the art to which the present disclosure belongs. In general, the nomenclature used in the present specification is well known and commonly used in the art.

Figure 1:
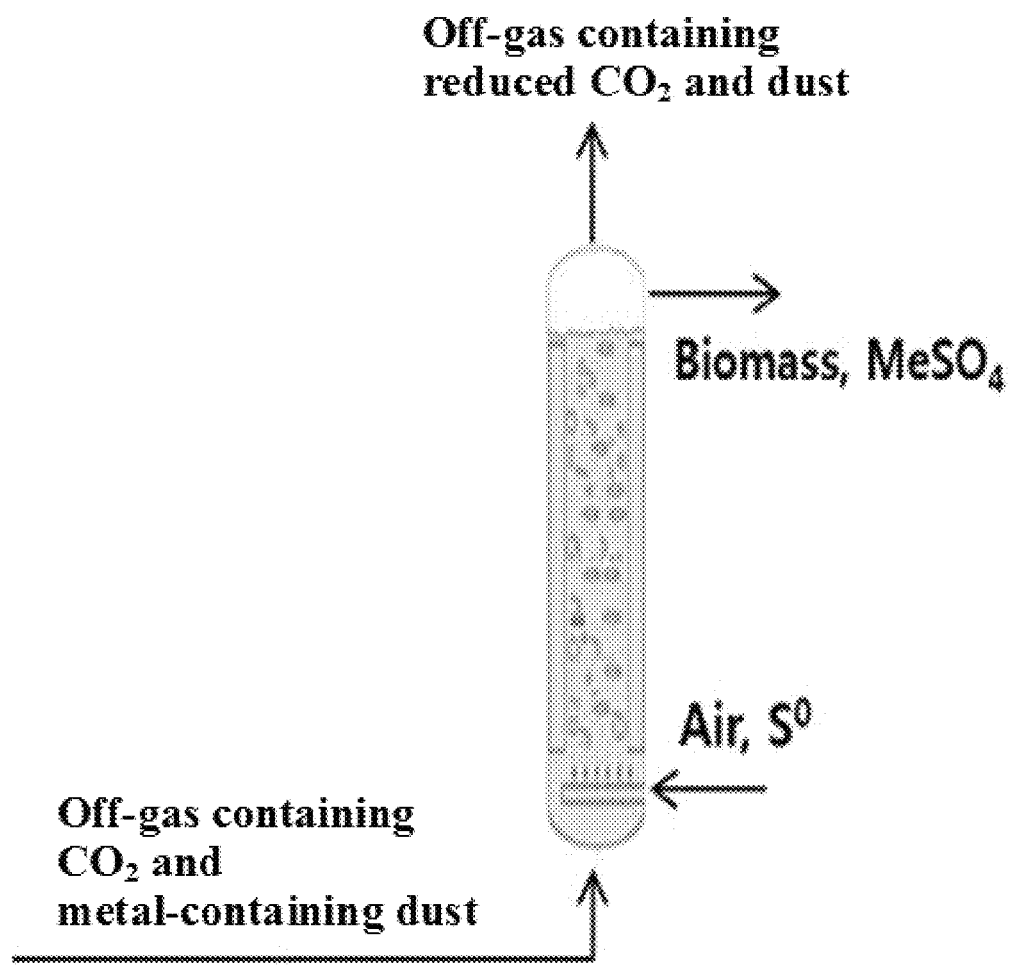
FIG. 1 is a view schematically showing a process of treating carbon dioxide and metal-containing dust according to one embodiment of the present invention.

The present invention relates to technology for converting carbon dioxide and reducing metal-containing dust. As shown in FIG. 1, it has been found that when an off-gas and/or fine gas containing carbon dioxide and metal-containing dust is passed directly through a microbial incubator, the microorganism in the microbial incubator produces sulfuric acid ($H_2SO_4$) while growing using the energy obtained through oxidation of sulfur, and uses the carbon dioxide contained in the off-gas as a carbon source, and the metals in the dust are used as pH neutralizers. According to this principle, an effect of simultaneously reducing the carbon dioxide and the metal-containing dust is obtained.

Therefore, one aspect of the present invention is directed to a method of reducing carbon dioxide and metal-containing dust, the method including a step of passing an off-gas, which contains carbon dioxide and metal-containing dust, through a sulfur-oxidizing microorganism reactor, thereby removing the carbon dioxide and metal-containing dust present in the off-gas.

Another aspect of the present invention is directed to a method of reducing carbon dioxide, the method including a step of culturing a sulfur-oxidizing microorganism by passing carbon dioxide through a sulfur-oxidizing microorganism reactor.

Still another aspect of the present invention is directed to a method of reducing sulfur, the method including a step of oxidizing sulfur or a sulfur-containing compound into sulfuric acid using a sulfur-oxidizing microorganism.

Yet another aspect of the present invention is directed to a method of reducing metal-containing dust, the method including the steps of: oxidizing sulfur or a sulfur-containing compound into sulfuric acid using a sulfur-oxidizing microorganism; and reacting the sulfuric acid with metals present in the metal-containing dust to produce metal sulfates.

According to the present invention, when the off-gas is passed through the sulfuric-acid-producing microorganism reactor, the sulfur in the off-gas is oxidized using the carbon dioxide as a carbon source to produce sulfuric acid. The produced sulfuric acid is allowed to react with the metal components or metal oxides (MeO) present in the metal-containing dust to produce metal sulfates ($MeSO_4$) while the microorganism grows.

The present invention is a method of treating and removing the metal components in the metal-containing dust with sulfuric acid produced while the carbon dioxide in the off-gas is converted into biomass by a biological method. This method is capable of removing metals present in the metal-containing dust using the produced sulfuric acid while converting the carbon dioxide using the sulfur-oxidizing microorganism. That is, the sulfuric acid may be produced by passing the off-gas through the microorganism reactor containing a sulfur-containing medium and allowing the microorganism to oxidize the sulfur using the carbon dioxide contained in the off-gas as a carbon source (see Reaction Formula 1 below).

$$Me/MeO + H_2SO_4 \rightarrow MeSO_4 + H_2O \quad \text{[Reaction Formula 1]}$$

(Me: Mg Ca, V, Cr, Mn, Co, Ni, Zn, Cu, Na, K, Fe, Cd, Sn, Pb, Nb, Mo, Ru, V, Ga, Sr, Ba, Ti, Zr, Sr)

In the present invention, the metal or the metal in the metal oxide may be Mg Ca, V, Cr, Mn, Co, Ni, Zn, Cu, Na, K, Fe, Cd, Sn, Pb, Nb, Mo, Ru, V, Ga, Sr, Ba, Ti, Zr or Sr, and any metal may be used without limitation, as long as it may produce sulfate by reaction with sulfuric acid.

As used herein, the term "sulfur-oxidizing microorganism reactor" or "sulfuric-acid-producing microorganism reactor" refers to a reactor in which the sulfur-oxidizing microorganism selectively uses carbon dioxide as a carbon source and is cultured in sulfur-containing medium.

In the present invention, the sulfur-oxidizing microorganism may be one or more selected from the group consisting of *Acidianus*, *Aquifex*, *Hydrogenobacter*, *Thiobacillus*, *Thiomicrospira*, *Sulfurimonas*, *Halothiobacillus*, *Acidithiobacillus* and *Thermithiobacillus*.

In the present invention, a more specific example of the microorganism may be:

A. *Acidianus ambivalens* or *Acidianus brierleyi*;

B. *Aquifex pyrophilus*;

C. *Hydrogenobacter acidophilus*, *Hydrogenobacter thermophiles*;

D. *Thiobacillus denitrificans*;

E. *Thiomicrospira crunogena*;

F. *Sulfurimonas autotrophica*, *Sulfurimonas denitrificans*, *Sulfurimonas gotlandica* or *Sulfurimonas paralvinellae*;

G. *Halothiobacillus halophilus*, *Halothiobacillus hydrothermalis*, *Halothiobacillus kellyi* or *Halothiobacillus neapolitanus*; or H. *Acidithiobacillus albertensis*, *Acidithiobacillus caldus*, *Acidithiobacillus cuprithermicus*, *Acidithiobacillus ferridurans*, *Acidithiobacillus ferrivorans*, *Acidithiobacillus ferrooxidans* or *Acidithiobacillus thiooxidans*.

In the present invention, the off-gas may be generated in processes of power plants, petroleum plants, waste combustion plants or steel mills, and may additionally contain atmospheric fine dust.

EXAMPLES

Hereinafter, the present invention will be described in more detail with reference to examples. It will be obvious to skilled in the art that these examples are merely to illustrate the present invention, and the scope of the present invention is not limited by these examples.

Example 1

1. Pre-Culture of Sulfur-Oxidizing Microorganism

In a reactor equipped with a $CO_2$ chamber, 50 ml of a medium containing 0.2 g/L $(NH_4)_2SO_4$, 0.5 g/L $MgSO_4 \cdot 7H_2O$, 250 mg/L $CaCl_2 \cdot 2H_2O$, 3 g/L $KH_2PO_4$, 10 mg/L $FeSO_4 \cdot 7H_2O$ and 10 g/L sulfur powder was placed in a 100-ml flask and inoculated with 1 ml of a sulfur-oxidizing microorganism. The microorganism was cultured under the conditions of culture temperature of 30° C. and stirring speed of 150 rpm for 7 days. Then, 200 ml of a medium containing the same components as described above was placed in a 1 L flask, and 2% of the culture was inoculated in the medium, cultured for 7 days, and then used for main culture inoculation.

2. Main Culture of Sulfur-Oxidizing Microorganism

Test group: In a reactor equipped with a $CO_2$ chamber, fly ash was added to a medium (containing 0.2 g/L $(NH_4)_2SO_4$, 3 g/L $KH_2PO_4$ and 10 g/L sulfur powder) at a concentration of 875 mg/L, and then 10% of the pre-cultured culture was inoculated into the medium. At this time, the pH was 2.15. The pH after 8 days of culture under conditions of 30° C. and 150 rpm was 1.20. The reason why the initial pH was low is because of the inoculated culture, and the reason why the pH decreased after culturing is because the sulfur-oxidizing microorganism produced sulfuric acid while growing (see FIG. 2).

Figure 2A:
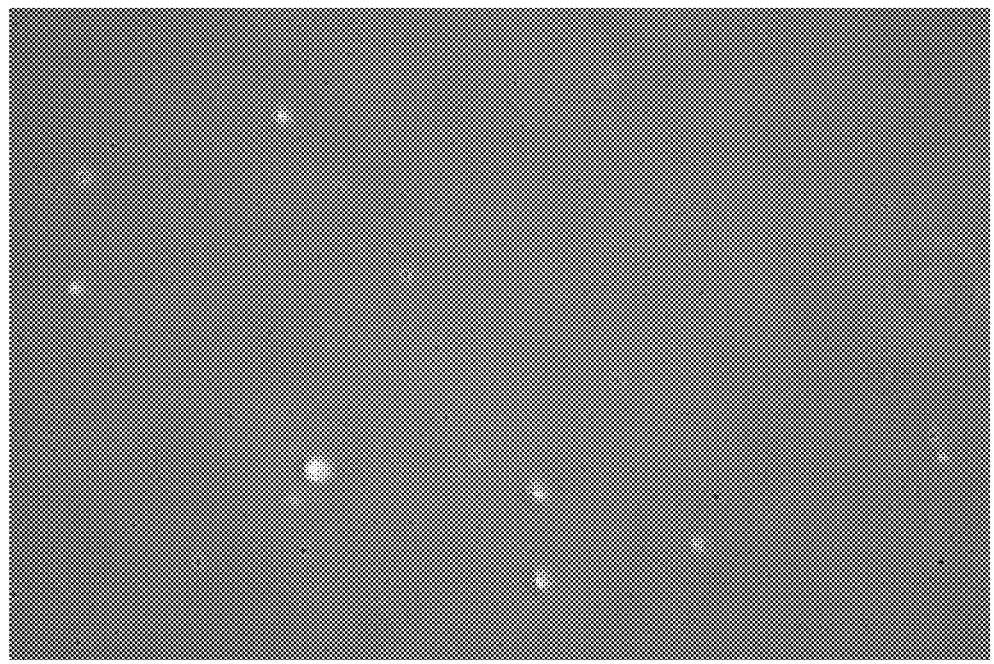
FIG. 2a and FIG. 2b depict images showing the number of microbial cells before culture (FIG. 2a) according to one embodiment of the present and the number of microbial cells after culture (FIG. 2b).
Figure 2B:
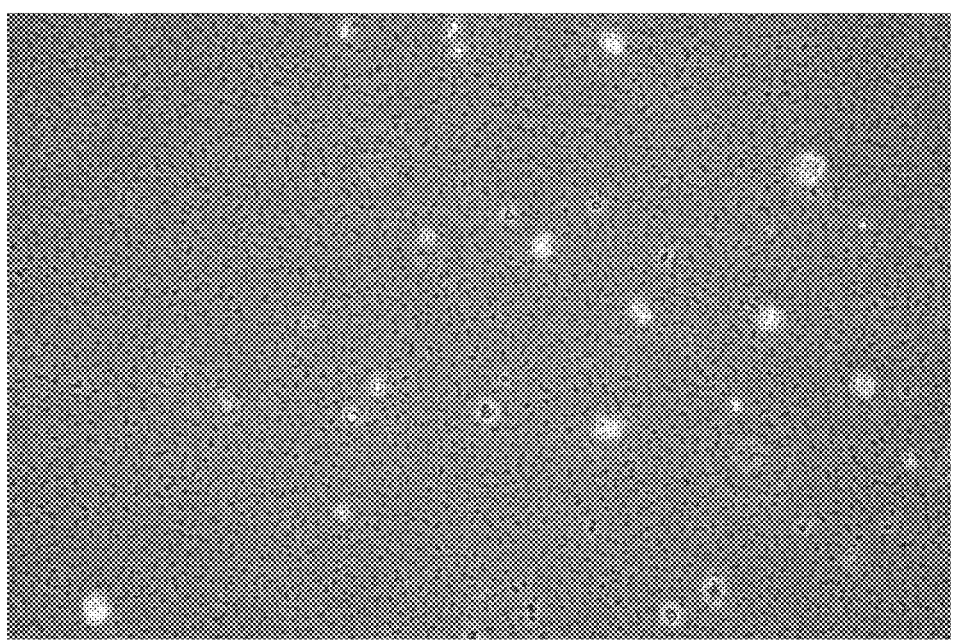

FIGS. 2(a) and 2(b) show the number of microbial cells before culture of the sulfur-oxidizing microorganism in comparison with the number of microbial cells after culture.

Control group: fly ash was added to a medium (containing 10 g/L sulfur powder) at a concentration of 875 mg/L, followed by 8 days of culture under conditions of 30° C. and 150 rpm. The initial pH was 11.0, and the pH after 8 days of culture was 7.63. The reason why the pH decreased is believed to be because carbonate was produced due to $CO_2$ in the air.

As shown in Table 1 below, the content of metal components in the culture medium of the test group was higher than in the control group shown in Table 2 below. From this, it can be seen that the metals in the fly ash were leached out by the sulfuric acid produced while the sulfur-oxidizing microorganism grew using carbon dioxide as a carbon source. Table 3 below showing the results of analyzing the content of metal components in the fly ash used in the experiment.

TABLE 1

Metal content in culture medium of test group

| Sample name | elements | | | | | | | | |
|---|---|---|---|---|---|---|---|---|---|
| | Al Content | Ca Content | Fe Content | Mg Content | Na Content | Ba Content | Sr Content | Ti Content | Mn Content |
| Before culture of test group | 3.8 | 56.9 | 2.1 | 6.2 | 18.4 | 0.1 | 0.4 | 0.1 | 0.3 |
| After culture of test group | 13.4 | 72.2 | 7.4 | 8.2 | 18.9 | 0.1 | 0.6 | 0.3 | 0.5 |

TABLE 1

Metal content in culture medium of control group

| Sample name | elements | | | | | | | | |
|---|---|---|---|---|---|---|---|---|---|
| | Al Content | Ca Content | Fe Content | Mg Content | Na Content | Ba Content | Sr Content | Ti Content | Mn Content |
| Before culture of control group | 0.5 | 17.5 | 0.1 | 0.3 | 1.0 | N/D | N/D | N/D | N/D |
| After culture of control group | 0.3 | 50.7 | N/D | 1.6 | 1.0 | 0.1 | 0.3 | N/D | N/D |

TABLE 3

Metal content in fly ash

| Sample name | elements | | | | | | | | |
|---|---|---|---|---|---|---|---|---|---|
| | Al Content | Ca Content | Fe Content | Mg Content | Na Content | Ba Content | Sr Content | Ti Content | Mn Content |
| Fly ash | 5.5 wt % | 8.5 wt % | 3.3 wt % | 5680 | 4820 | 730 | 940 | 2170 | 910 |

From the results of the Examples above, it was confirmed that when the off-gas containing carbon dioxide and metal-containing dust was passed through the sulfur-oxidizing microorganism reactor, the carbon dioxide could be removed using the sulfur-oxidizing microorganism, and the same time, metals in the metal-containing dust could be removed using the produced sulfuric acid.

INDUSTRIAL APPLICABILITY

The method of reducing carbon dioxide and metal-containing dust according to the present invention has the effect of simultaneously reducing carbon dioxide and metal-containing dust according to the principle by which $CO_2$ contained in the off-gas is used as a carbon source and the metals present in the dust are used as pH neutralizers and nutrient sources.

Although the present invention has been described in detail with reference to the specific features, it will be apparent to those skilled in the art that this description is only of a preferred embodiment thereof, and does not limit the scope of the present invention. Thus, the substantial scope of the present invention will be defined by the appended claims and equivalents thereof.

The invention claimed is:

1. A method of reducing carbon dioxide and metal-containing dust, the method comprising:

removing the carbon dioxide and metal-containing dust present in off-gas by passing the off-gas which contains carbon dioxide and metal-containing dust through reactor containing sulfur-oxidizing microorganisms.

2. The method of reducing carbon dioxide and metal-containing dust of claim 1, wherein the sulfur-oxidizing microorganisms produce sulfuric acid by oxidizing sulfur using carbon as a carbon source, and the sulfuric acid produced reacts with the metal contained in the dust to produce metal sulfate.

3. The method of reducing carbon dioxide and metal-containing dust of claim 1, wherein the metal is one or more selected from the group consisting of Mg Ca, V, Cr, Mn, Co, Ni, Zn, Cu, Na, K, Fe, Cd, Sn, Pb, Nb, Mo, Ru, V, Ga, Sr, Ba, Ti, Zr and Sr.

4. The method of reducing carbon dioxide and metal-containing dust of claim 1, wherein the sulfur-oxidizing microorganism is one or more selected from the group consisting of *Acidianus, Aquifex, Hydrogenobacter, Thiobacillus, Thiomicrospira, Sulfurimonas, Halothiobacillus, Acidithiobacillus* and *Thermithiobacillus*.

5. The method of reducing carbon dioxide and metal-containing dust of claim 1, wherein the off-gas contains carbon dioxide or carbon dioxide and metal-containing dust.

6. A method of reducing metal-containing dust, the method comprising:
   oxidizing sulfur or a sulfur-containing compound into sulfuric acid using sulfur-oxidizing microorganisms; and
   producing metal sulfates by reacting the sulfuric acid with the metal present in the metal-containing dust.

\* \* \* \* \*